United States Patent
Nakade

(10) Patent No.: US 9,580,247 B2
(45) Date of Patent: Feb. 28, 2017

(54) TRAVELLING VEHICLE SYSTEM

(71) Applicant: Murata Machinery, Ltd., Kyoto-shi, Kyoto (JP)

(72) Inventor: Eita Nakade, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 14/842,527

(22) Filed: Sep. 1, 2015

(65) Prior Publication Data
US 2016/0060036 A1  Mar. 3, 2016

(30) Foreign Application Priority Data

Sep. 2, 2014 (JP) .................................. 2014-178447

(51) Int. Cl.
| | |
|---|---|
| *B61L 19/06* | (2006.01) |
| *B61L 23/34* | (2006.01) |
| *B65G 1/137* | (2006.01) |
| *G06Q 10/08* | (2012.01) |
| *B65G 1/06* | (2006.01) |
| *B61L 15/00* | (2006.01) |
| *B61L 27/00* | (2006.01) |

(52) U.S. Cl.
CPC .......... *B65G 1/137* (2013.01); *B61L 15/0027* (2013.01); *B61L 19/06* (2013.01); *B61L 23/34* (2013.01); *B61L 27/0038* (2013.01); *B65G 1/065* (2013.01); *G06Q 10/08* (2013.01)

(58) Field of Classification Search
CPC .......... B65G 1/137; B65G 1/065; B61B 13/02
See application file for complete search history.

(56) References Cited

U.S. PATENT DOCUMENTS

| | | | | |
|---|---|---|---|---|
| 2003/0153236 A1* | 8/2003 | Ruocchio | ............... | A63H 19/32 446/104 |
| 2006/0218475 A1* | 9/2006 | Bodin | ................... | G06F 17/218 715/203 |
| 2011/0106341 A1* | 5/2011 | Kinoshita | ............ | G05D 1/0289 701/2 |

FOREIGN PATENT DOCUMENTS

| | | | | |
|---|---|---|---|---|
| JP | 08099792 A | | 4/1996 | |
| JP | 200426493 A | * | 2/2003 | ............. G07B 15/00 |
| WO | 2009142051 A1 | | 11/2009 | |

* cited by examiner

*Primary Examiner* — Yonel Beaulieu
*Assistant Examiner* — Martin Weeks
(74) *Attorney, Agent, or Firm* — DLA Piper LLP (US)

(57) ABSTRACT

To allow a travelling vehicle to travel more smoothly, a host controller of a travelling vehicle system includes a first determination part which determines whether or not a second track selected by a first travelling vehicle is the same as a second track selected by a second travelling vehicle, and an entry permission issuing part that issues an entry permission into a switching track to the second vehicle after checking passage of the first vehicle through the switching track when the second track selected by the first vehicle is different from the second track selected by the second vehicle, and issues the entry permission into the switching track to the second vehicle regardless of receipt or non-receipt of the passage report from the first vehicle when the second track selected by the first vehicle is the same as the second track selected by the second vehicle.

6 Claims, 6 Drawing Sheets

FIG. 6

TRAVELLING VEHICLE SYSTEM

BACKGROUND OF THE INVENTION

This application claims the benefit of priority under 35 USC 119 of Japanese application no. 2014-178447, filed on Sep. 2, 2014, which is incorporated herein by reference.

BACKGROUND OF THE INVENTION

1. Field of the Invention

The present invention relates to a travelling vehicle system for carrying a cargo along a track to transfer the cargo to a rack or the like.

2. Description of the Related Art

There has hitherto been known a travelling vehicle system for allowing a travelling vehicle to travel along a rail (one example of a track) hung on a ceiling, to carry a cargo in the vicinity of the ceiling. The travelling vehicle includes a lift stage liftably hung by means of a hanging member. The travelling vehicle transfers the cargo by lowering the lift stage to a placement member of a rack arranged along a travelling route of the travelling vehicle.

The track is installed in accordance with arrangement of the rack. The travelling route formed by the track typically includes a divergence part and a merging part (e.g., International Publication WO2009/142051). In the divergence part and the merging part, a switching track for connecting one track to one of a plurality of tracks is provided. The travelling vehicle selects a travelling route in accordance with a cargo loading/unloading instruction, to load and unload a cargo.

However, when the plurality of travelling vehicles are allowed to travel, there may arise a need for waiting before the switching track in order to obtain a permission to enter the switching track, which is problematic. From the viewpoints of efficiency in loading/unloading a cargo, reduction in operation time, and the like, it has been required to allow the travelling vehicle to travel more smoothly.

BRIEF SUMMARY OF THE INVENTION

The present invention was made in view of the above problem, and has an object to provide a travelling vehicle system capable of allowing a travelling vehicle to travel more smoothly.

In order to achieve the above object, a travelling vehicle system according to the present invention includes: a track including a first track and a plurality of second tracks; a plurality of travelling vehicles including a first travelling vehicle travelling along the track and a second travelling vehicle travelling behind the first travelling vehicle along the track; a first travelling vehicle controller provided in the first travelling vehicle; a second travelling vehicle controller provided in the second travelling vehicle; a switching track which is provided between the first track and the plurality of second tracks and connects the first track to one of the plurality of second tracks; a track controller which controls the switching track; and a host controller which issues an entry permission into the switching track to the plurality of travelling vehicles, wherein the host controller has a first acquisition part which acquires, from the second travelling vehicle controller, first destination information showing one second track selected by the second travelling vehicle controller out of the plurality of second tracks, a first determination part which determines whether or not the second track selected by the first travelling vehicle controller is the same as the second track selected by the second travelling vehicle controller, by use of the first destination information, and an entry permission issuing part which issues the entry permission, the entry permission issuing part issuing the entry permission into the switching track to the second travelling vehicle controller after checking passage of the first travelling vehicle through the switching track when the first determination part determines that the second track selected by the first travelling vehicle controller is different from the second track selected by the second travelling vehicle controller, and the entry permission issuing part issuing the entry permission into the switching track to the second travelling vehicle controller regardless of receipt or non-receipt of the passage report from the first travelling vehicle controller when the first determination part determines that the second track selected by the first travelling vehicle controller is the same as the second track selected by the second travelling vehicle controller.

In the travelling vehicle system with the above configuration, when the second tracks selected by the two travelling vehicles are the same, the host controller issues the entry permission into the switching track to the second travelling vehicle without waiting for the passage report from the first travelling vehicle. When the second track selected by the second travelling vehicle is the same as the second track selected by the first travelling vehicle travelling ahead, it is not necessary to switch the switching track. That is, when the second tracks selected by the two travelling vehicles are the same, for issuing the entry permission into the switching track to the second travelling vehicle, it is not necessary to wait for the report on passage through the switching track by the first travelling vehicle.

This eliminates the need for the second travelling vehicle to wait before the switching track so as to obtain the entry permission from the host controller. In the travelling vehicle system with the above configuration, the second travelling vehicle can be operated smoothly. It is to be noted that, when a larger number of travelling vehicles are arranged on the track, an effect exerted by adopting the above configuration is considered to increase.

Moreover, the second travelling vehicle controller may include a second acquisition part which acquires second destination information showing the second track on a side connected to the first track via the switching track, and a second determination part which allows the travelling vehicle to enter the switching track when the second track shown by the second destination information is the same as the second track selected by the second travelling vehicle controller and when the entry permission is issued from the host controller.

In the travelling vehicle system with the above configuration, the second travelling vehicle enters the switching track when being shown by the second destination information that the switching track is connected to the selected second track and when accepting the entry permission, whereby it is possible to allow the second travelling vehicle to travel safely and smoothly.

Moreover, the host controller may further include a list generation part which, upon receipt of a passage report showing passage through the switching track from the second travelling vehicle controller, generates a list showing an alignment sequence of a plurality of travelling vehicles on the second track selected by the second travelling vehicle controller, and a first communication part which transmits the list to the second travelling vehicle controller.

This can facilitate the second travelling vehicle to specify the first travelling vehicle traveling ahead.

Moreover, the second travelling vehicle may further include a position detection part which detects a position on the track, and a second communication part which communicates with the first travelling vehicle, and the second travelling vehicle controller may further include a third acquisition part which acquires position information of the first travelling vehicle from the first travelling vehicle controller, an inter-vehicle distance calculation part which calculates an inter-vehicle distance between the first travelling vehicle and the second travelling vehicle by use of the position information, and an inter-vehicle distance control part which stops or decelerates the second travelling vehicle when the inter-vehicle distance is shorter than a previously set distance.

In the travelling vehicle system with the above configuration, it is possible to effectively prevent the second travelling vehicle from being collided with the first travelling vehicle.

Moreover, the second communication part may be configured to be wirelessly communicable with the host controller during travelling.

In the travelling vehicle system with the above configuration, it is possible for the second travelling vehicle to wirelessly communicate with the host controller while travelling, so as to transmit information to the host controller and receive information from the host controller in real time. It is to be noted that, when it is configured such that communication is performed only at a specific point (or in a specific area), the waiting time may be generated until transmission or reception of a variety of data. In the travelling vehicle system with the above configuration, it is possible to transmit and receive a variety of data in real time, so as to start processing based on the data in real time.

Moreover, the host controller may further include a track control part which transmits, to the track controller, connection information showing the second track to be connected to the first track after receipt of the passage report from the first travelling vehicle controller when the first determination part determines that the second track selected by the first travelling vehicle controller is different from the second track selected by the second travelling vehicle controller, and which transmits, to the track controller, the connection information regardless of receipt or non-receipt of the passage report from the first travelling vehicle controller when the first determination part determines that the second track selected by the first travelling vehicle controller is the same as the second track selected by the second travelling vehicle controller.

Accordingly, in the travelling vehicle system with the above configuration, it is possible to reduce the time until the entry permission into the switching track is issued to the second travelling vehicle. When the second track selected by the first travelling vehicle is the same as the second track selected by the second travelling vehicle, the switching track is not controlled substantially. Hence even when the connection information showing the second track selected by the second travelling vehicle is transmitted to the track controller before the first travelling vehicle passes through the switching track, the first travelling vehicle can travel safely.

According to the present invention, it is possible to allow a travelling vehicle to travel more smoothly.

BRIEF DESCRIPTION OF THE DRAWINGS

FIG. 6 is a block diagram illustrating one example of the configuration of the travelling vehicle system.

DETAILED DESCRIPTION OF PREFERRED EMBODIMENT

Next, an embodiment of a travelling vehicle system according to the present invention will be described with reference to the drawings. It is to be noted that the following embodiment only shows one example of the travelling vehicle system according to the present invention. Hence the scope of the present invention is defined by wording in the claims with reference to the following embodiment, and not restricted only to the following embodiment.

Embodiment

A travelling vehicle system of an embodiment will be described using FIGS. 1 to 6.

[1. Configuration of Travelling Vehicle System]

Figure 1:
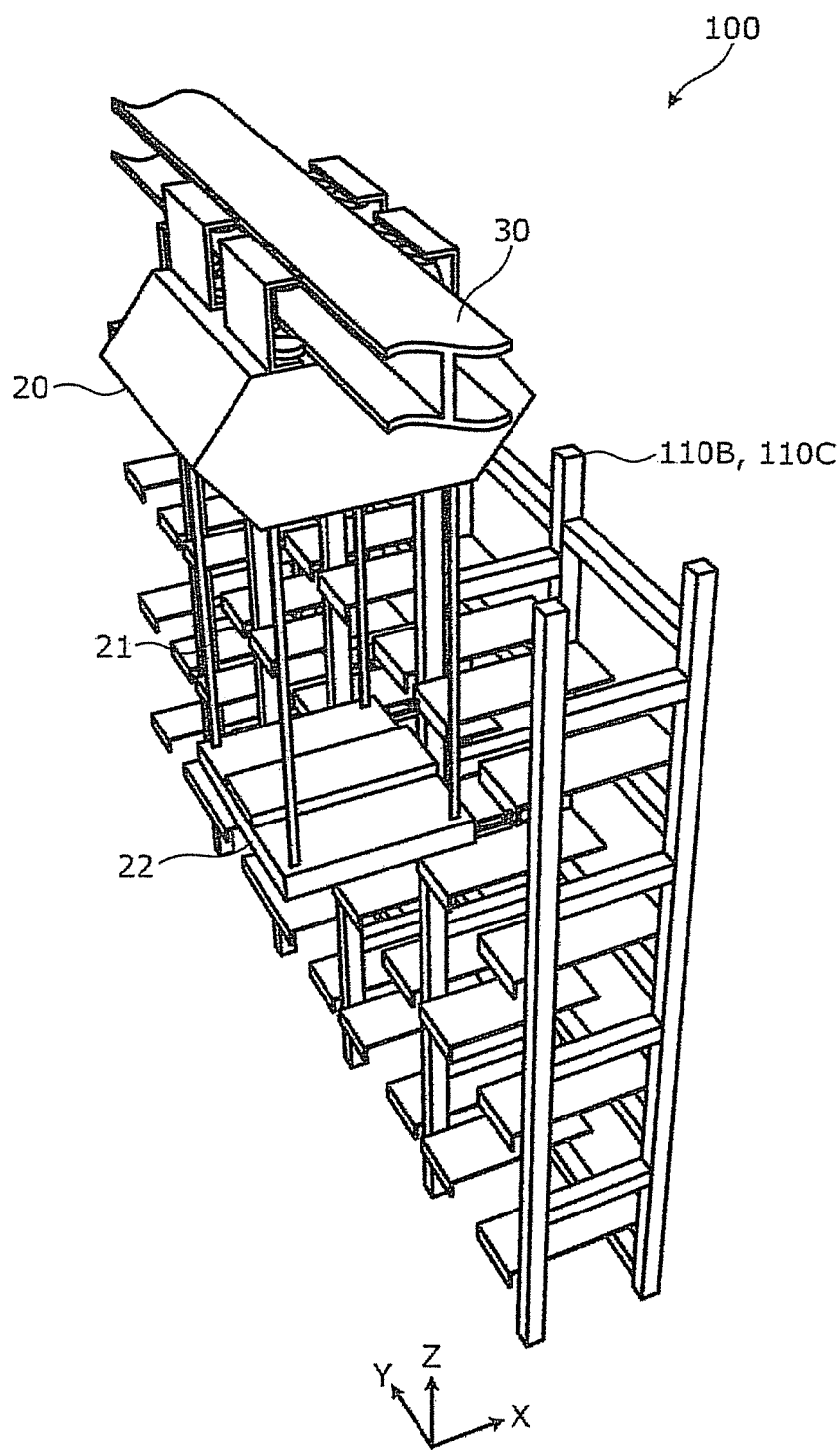
FIG. 1 is a perspective view illustrating a part of a travelling vehicle system.
Figure 2:
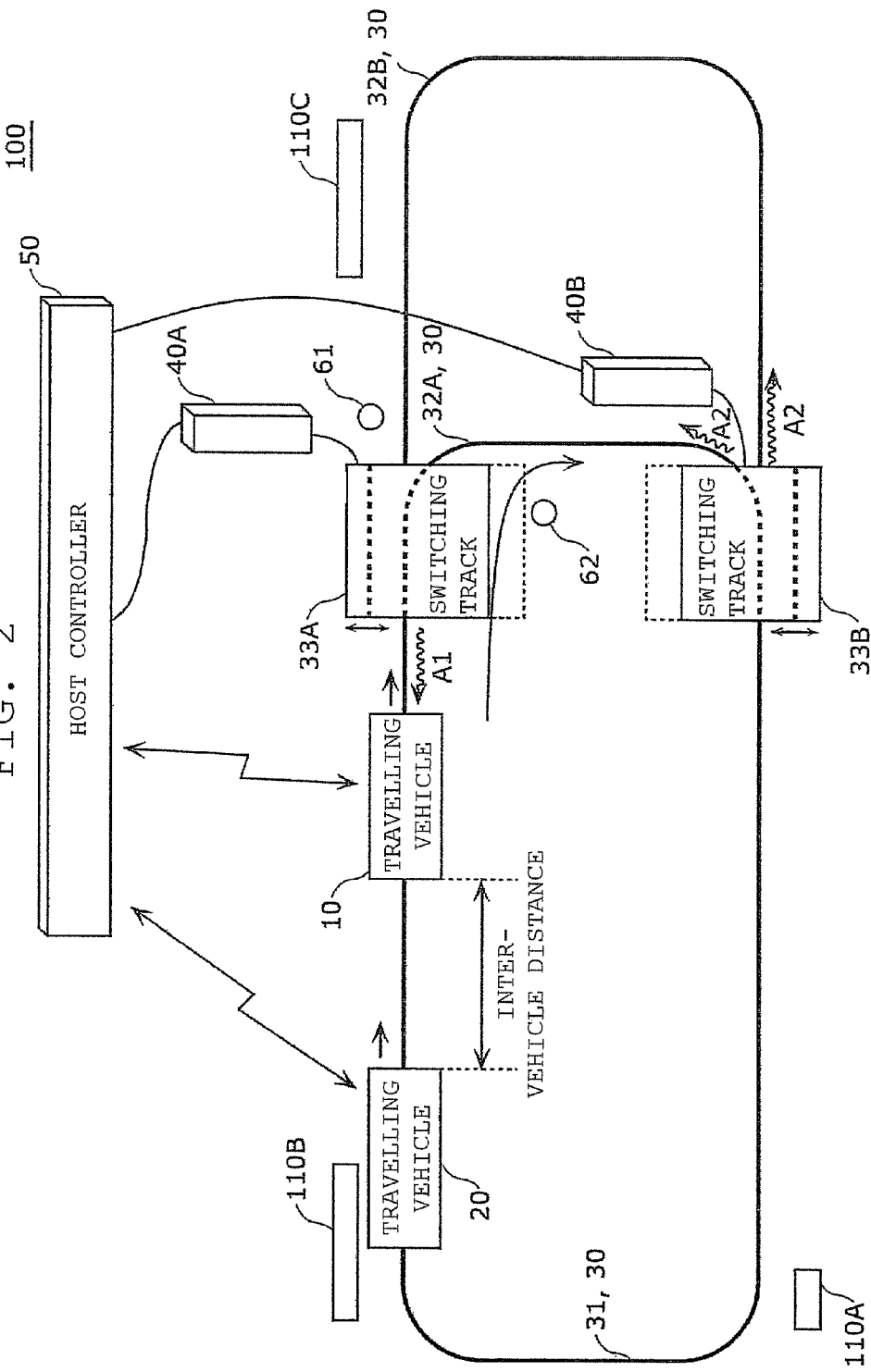
FIG. 2 is a view illustrating one example of a configuration of the travelling vehicle system.
Figure 3:
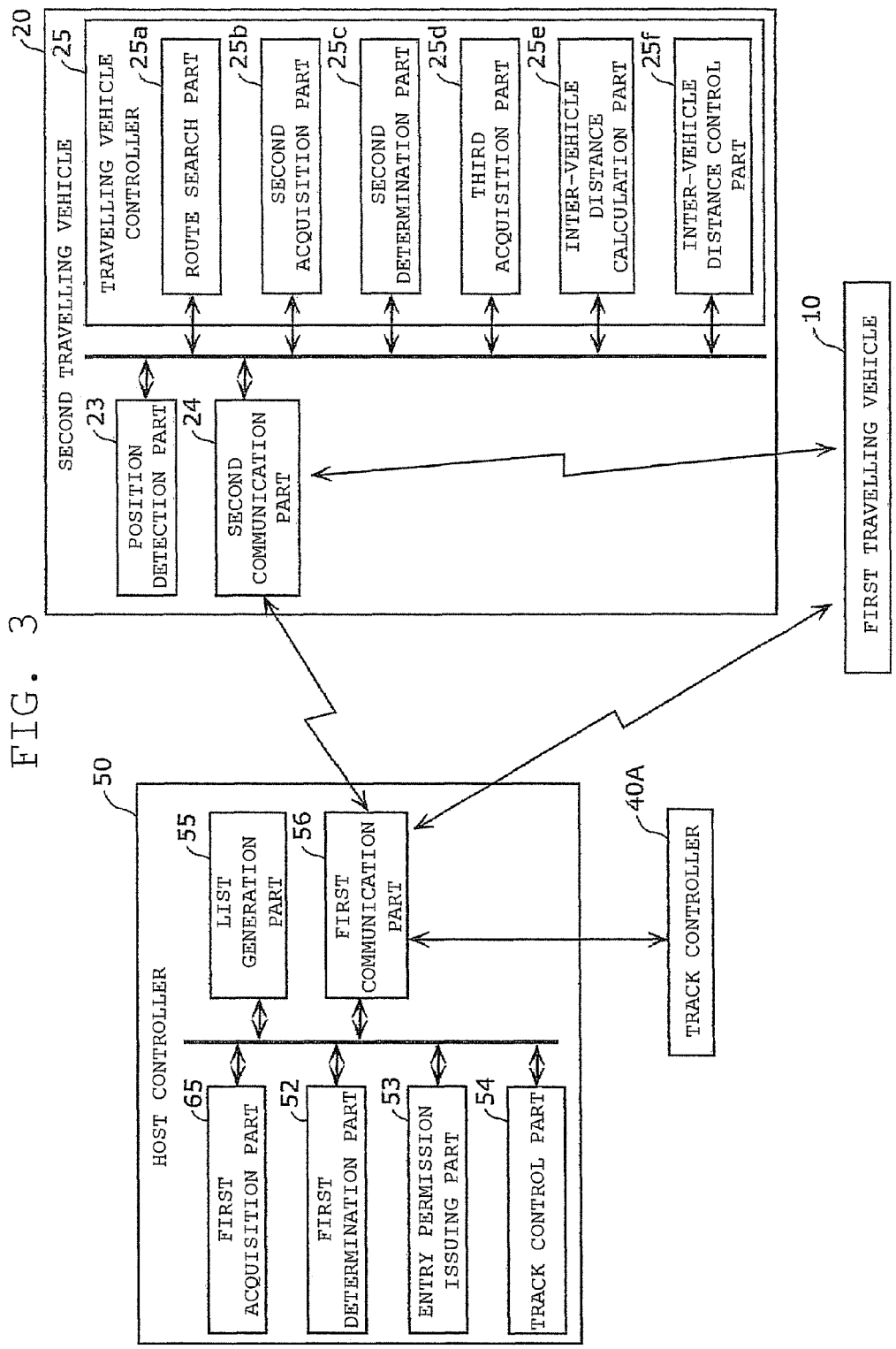
FIG. 3 is a block diagram illustrating one example of the configuration of the travelling vehicle system.

FIG. 1 is a perspective view illustrating a part of the travelling vehicle system. FIG. 2 is a view illustrating one example of a configuration of the travelling vehicle system. FIG. 3 is a block diagram illustrating one example of the configuration of the travelling vehicle system.

A travelling vehicle system 100 is a system for automatically storing and carrying out a cargo. The travelling vehicle system 100 carries cargos by means of a first travelling vehicle 10 and a second travelling vehicle 20 which travel along a rail 30, and transfers the cargos between the racks 110A to 110C and the travelling vehicles, to store and carry the cargos.

As illustrated in FIGS. 1 and 2, the travelling vehicle system 100 includes the racks 110A to 110C, the rail 30, switching tracks 33A and 33B, track controllers 40A and 40B, a host controller 50, sensors 61 and 62, the first travelling vehicle 10, and the second travelling vehicle 20. It is to be noted that in the present embodiment, for the sake of description, a case where the number of travelling vehicles is two: the first travelling vehicle 10 and the second travelling vehicle 20, will be described, but the number of travelling vehicles is not restricted to two.

The rack 110A, though not illustrated, is a rack that is used at the time of carrying in and carrying out a cargo. As illustrated in FIG. 1, the racks 110B and 110C are equipment capable of storing cargos along a travelling direction in which the first travelling vehicle 10 and the second travelling vehicle 20 travel (Y-axis direction in the drawing in the case of the present embodiment). The racks 110A to 110C can further store cargos in a perpendicular direction. In the racks 110A to 110C, placement members for placing and storing cargos are provided in parallel in a direction along the travelling direction and in a vertical direction (Z-axis direction in the drawing). It is to be noted that the configuration and arrangement of the racks 110A to 110C are not restricted to these.

[1-1. Configuration of Track]

The rail 30 is one example of the track, and provided on a ceiling. The rail 30 includes a rail 31, a rail 32A and a rail 32B in the present embodiment. The rail 31 is one example of the first track. The rails 32A and 32B are each one example of a plurality of second tracks. One end of the rail 31 is connected to one end of the rail 32A or one end of the rail 32B via a switching track 33A, and the other end of the rail 31 is connected to the other end of the rail 32A or the other end of the rail 32B via a switching track 33B. An elliptical-shaped first travelling route is formed by the rail 31 and the rail 32A, and an elliptical-shaped second travelling route larger than the first travelling route is formed by the rail 31 and the rail 32B. In other words, the rail 32A is arranged so as to take a short cut on the elliptical-shaped travelling route formed by the rail 31 and the rail 32B. In FIG. 2, the first travelling vehicle 10 and the second travelling vehicle 20 travel on the first travelling route or the second travelling route in a clockwise direction in the drawing.

Further, barcodes that store information showing positions on the rail 30 are stuck to the rail 30 at a plurality of places.

[1-2. Configuration of Switching Track]

The switching track 33A is provided between the rail 31 and the rails 32A/32B (hereinafter appropriately abbreviated as "divergence part"), and links the rail 31 to the rail 32A or the rail 32B. The switching track 33A is configured slidably in a vertical direction in the drawing in accordance with control from the track controller 40A.

The switching track 33A is formed with a rail which connects the rail 31 and the rail 32A at the time of sliding in an upward direction in the drawing, and formed with a rail which connects the rail 31 and the rail 32B at the time of sliding in a downward direction in the drawing. By sliding the switching track 33A, the rail 31 can be linked to either the rail 32A or the rail 32B. FIG. 2 illustrates a state where the switching track 33A has been slid in the upward direction, and the rail 31 is linked with the rail 32A.

The switching track 33B is provided between the rails 32A/32B and the rail 31 (hereinafter appropriately abbreviated as "merging part"), and links the rail 32A or the rail 32B to the rail 31. The switching track 33B is configured slidably in the vertical direction in the drawing in accordance with control from the track controller 40B.

The switching track 33B is formed with a rail which connects the rail 32B and the rail 31 at the time of sliding in the upward direction in the drawing, and formed with a rail which connects the rail 32A and the rail 31 at the time of sliding in the downward direction in the drawing. By sliding the switching track 33B, either the rail 32A or the rail 32B can be connected to the rail 31. FIG. 2 illustrates a state where the switching track 33B has been slid in the downward direction, and the rail 32A is connected with the rail 31.

[1-3. Configuration of Track Controller]

The track controller 40A controls the switching track 33A. Specifically, the track controller 40A accepts, from the host controller 50, connection information showing a rail to be connected to the rail 31. The track controller 40A determines whether or not the rail currently connected to the rail 31 agrees with the rail shown by the connection information. When the currently connected rail agrees with the rail shown by the connection information, the track controller 40A outputs a switching completion report to the host controller 50. When the currently connected rail does not agree with the rail shown by the connection information, the track controller 40A transmits to the switching track 33A a switching request for switching the rail connected to the rail 31 to the rail shown by the connection information. When switching the rail connected to the rail 31 is completed in the switching track 33A, the track controller 40A outputs the switching completion report to the host controller 50.

With the switching track 33A provided in the divergence part of the rail, the connection information stores information showing either the rail 32A or 32B that is a divergence destination out of the rails to be connected to the switching track 33A. It is to be noted that the connection information is not restricted to this. The connection information may not be information showing the rail itself, but it may be other information that allows checking of which rail is the rail connected to the rail 31 by the switching track 33A, such as information showing whether the switching track is connected on the right side or connected on the left side.

For example, when the rail shown by the connection information is the rail 32A, the track controller 40A determines whether or not the rail connected to the rail 31 that is a branch source by the switching track 33A is the rail 32A. When the rail connected to the rail 31 by the switching track 33A is the rail 32A, the track controller 40A transmits the switching completion report to the host controller 50. When the rail connected to the rail 31 by the switching track 33A is the rail 32B, the track controller 40A slides the switching track 33A to link the rail 31 and the rail 32A.

The track controller 40B controls the switching track 33B. Specifically, the track controller 40B accepts, from the host controller 50, connection information showing a rail to be connected to the rail 31. The track controller 40B determines whether or not the rail currently connected to the rail 31 agrees with the rail shown by the connection information. When the currently connected rail agrees with the rail shown by the connection information, the track controller 40B outputs a switching completion report to the host controller 50. When the currently connected rail does not agree with the rail shown by the connection information, the track controller 40A transmits to the switching track 33B a switching request for switching the rail connected to the rail 31 to the rail shown by the connection information. When switching the rail connected to the rail 31 is completed in the switching track 33B, the track controller 40B outputs the switching completion report to the host controller 50.

With the switching track 33B provided in the merging part, the connection information stores information showing either the rail 32A or 32B that is a merging source out of the tracks to be connected to the switching track 33B.

For example, when the rail shown by the connection information is the rail 32A, the track controller 40B determines whether or not the track connected to the rail 31 that is a merging destination by the switching track 33B is the rail 32A. When the track connected to the rail 31 by the switching track 33B is the rail 32A, the track controller 40B transmits the switching completion report to the host controller 50. When the track connected to the rail 31 by the switching track 33B is the rail 32B, the track controller 40B slides the switching track 33B to link the rail 31 and the rail 32A.

[1-4. Configuration of Host Controller]

The host controller 50 is a controller for controlling the travelling vehicle system in the present embodiment.

As illustrated in FIG. 3, the host controller 50 includes a first acquisition part 51, a first determination part 52, an entry permission issuing part 53, a track control part 54, a list generation part 55, and a first communication part 56.

The first acquisition part 51 acquires, from the travelling vehicle controller 25 of the second travelling vehicle 20, first destination information showing one rail selected by the second travelling vehicle 20 out of the rails 32A and 32B. In the present embodiment, the first acquisition part 51 acquires the first destination information from each of all travelling vehicles including the first travelling vehicle 10. The first acquisition part 51 acquires the first destination information via the first communication part 56.

The first determination part 52 determines whether or not the second track selected by the first travelling vehicle 10 is the same as the second track selected by the second travelling vehicle 20 by use of the first destination information acquired from the travelling vehicle controller of the first travelling vehicle 10 and the travelling vehicle controller 25 of the second travelling vehicle 20.

The entry permission issuing part 53 issues an entry permission into the switching track to each of the travelling vehicles. When the first determination part 52 determines that the second track selected by the first travelling vehicle 10 is different from the second track selected by the second travelling vehicle 20, the entry permission issuing part 53 issues the entry permission into the switching track to the second travelling vehicle 20 after receipt of a passage report showing passage through the switching track 33A from the travelling vehicle controller of the first travelling vehicle 10. When the first determination part 52 determines that the second track selected by the first travelling vehicle 10 is the same as the second track selected by the second travelling vehicle 20, the entry permission issuing part 53 issues the entry permission into the switching track 33A to the second travelling vehicle 20 regardless of receipt or non-receipt of the passage report from the travelling vehicle controller of the first travelling vehicle 10. In the present embodiment, the entry permission issuing part 53 wirelessly issues the entry permission into the switching track 33A to the first travelling vehicle 10 and the second travelling vehicle 20 via the first communication part 56.

The track control part 54 transmits, to the track controllers 40A and 40B, connection information showing the rail (rail 32A or 32B) to be connected to the rail 31. Specifically, when the first determination part 52 determines that the second track selected by the first travelling vehicle 10 is different from the second track selected by the second travelling vehicle 20, the track control part 54 transmits to the track controller 40A the connection information showing the second track that is a connection destination of the first track after receipt of the passage report from the travelling vehicle controller of the first travelling vehicle 10. When the first determination part 52 determines that the second track selected by the first travelling vehicle 10 is the same as the second track selected by the second travelling vehicle 20, the track control part 54 transmits the connection information to the track controller 40A regardless of receipt or non-receipt of the passage report from the travelling vehicle controller of the first travelling vehicle 10.

Upon receipt of a passage report showing passage through the switching track 33A from the travelling vehicle controller 25 of the second travelling vehicle 20, the list generation part 55 generates a list showing an alignment sequence of a plurality of travelling vehicles on the second track selected by the second travelling vehicle 20.

The first communication part 56 wirelessly communicates with the track controllers 40A and 40B, the first travelling vehicle 10 and the second travelling vehicle 20. The first communication part 56 transmits the entry permission into the switching track 33A to the first travelling vehicle 10 and the second travelling vehicle 20. Further, the first communication part 56 transmits the list generated by the list generation part 55 to the second travelling vehicle 20.

[1-5. Configuration of Sensor]

The sensors 61 and 62 detect the state of the switching track 33A, and outputs a report signal A1 including second destination information showing the second track connected to the rail 31 via the switching track 33A. The rail 31 is one example of the first track. It is to be noted that as the second destination information, for example, there are considered not only information showing the rail itself, but other information that allows checking of which rail is the rail connected to the rail 31 by the switching track 33A, such as information showing whether the switching track 33A is connected on the right side or connected on the left side. The sensors 61 and 62 constantly output the report signal A1 during system operation. It is to be noted that a reaching range of the report signal A1 is restricted. When the first travelling vehicle 10 and the second travelling vehicle 20 enter the reaching range of the report signal A1, they can receive the report signal A1, so as to detect the state of the switching track 33A.

Although a case where the sensors 61 and 62 are provided in the switching track 33A will be described in the present embodiment, there may be formed a configuration where a sensor is also provided on the switching track 33B and a report signal A2 is outputted therefrom.

[1-6. Configuration of Travelling Vehicle]

The first travelling vehicle 10 and the second travelling vehicle 20 are travelling vehicles that travel along the track, and travel while being hung on the rail 30. Specific travelling vehicle numbers are allocated to the first travelling vehicle 10 and the second travelling vehicle 20, respectively. It should be noted that configurations of the first travelling vehicle 10 and the second travelling vehicle 20 are the same, and in the following, the configuration of the second travelling vehicle 20 will be described.

As illustrated in FIG. 1, the second travelling vehicle 20 is equipped with a hanging member 21 and a lift stage 22. The hanging member 21 is a member for connecting the second travelling vehicle 20 and the lift stage 22 and hanging the lift stage 22 on the second travelling vehicle 20. The hanging member 21 is a member having flexibility to such an extent as to be reelable and it is, for example, a metal wire or chain. In the case of the present embodiment, the lift stage 22 is hung by use of four hanging members 21. The lift stage 22 is a stage that holds a cargo while being in the state of being hung on the travelling vehicle by the hanging members 21. In the present embodiment, the lift stage 22 includes a transfer device capable of transferring the cargo between the racks 110A to 110C and the lift stage 22.

In the present embodiment, the second travelling vehicle 20 travels by driving a motor with electric power that is fed via a power feeder wired along the rail 30. It is to be noted that the second travelling vehicle 20 may be configured so as to receive power supply from a mounted battery. The second travelling vehicle 20 further includes a motor capable of reeling the hanging member 21, and can reel or send out the hanging member 21, to lift or lower the lift stage 22 hung by the hanging member 21.

As illustrated in FIG. 3, the second travelling vehicle 20 includes a position detection part 23, a second communication part 24 and the travelling vehicle controller 25.

The position detection part 23 detects the position of the second travelling vehicle 20 on the track. The position detection part 23 is configured of optical equipment that reads a barcode attached to the rail 30 and outputs a reading result to the travelling vehicle controller 25. The barcode includes information showing a position, and the travelling vehicle controller 25 can acquire position information by analyzing the information shown by the barcode.

The second communication part 24 is configured to be wirelessly communicable with the first communication part 56 of the host controller 50 and a second wireless communication part of the first travelling vehicle 10. In the present embodiment, the second communication part 24 can communicate during travelling.

The travelling vehicle controller 25 is a second travelling vehicle controller for controlling movement of the second travelling vehicle 20 and transfer of a cargo. The travelling vehicle controller 25 includes a route search part 25a, a second acquisition part 25b, a second determination part 25c, a third acquisition part 25d, an inter-vehicle distance calculation part 25e and an inter-vehicle distance control part 25f.

The route search part 25a accepts a cargo loading/unloading instruction from the host controller 50, to set a travelling route on which the second travelling vehicle 20 is allowed to travel.

The second acquisition part 25b acquires second destination information showing a rail connected to the rail 31.

The second determination part 25c allows the second travelling vehicle 20 to enter the switching track 33A when the second track shown by the second destination information is the same as the second track selected by the travelling vehicle on which the travelling vehicle controller is mounted and when the host controller 50 issues the entry permission.

The third acquisition part 25d acquires position information of the first travelling vehicle 10 from the travelling vehicle controller of the first travelling vehicle 10.

The inter-vehicle distance calculation part 25e calculates an inter-vehicle distance between the first travelling vehicle 10 and the second travelling vehicle 20 by use of the position information.

The inter-vehicle distance control part 25f stops or decelerates the second travelling vehicle 20 when the inter-vehicle distance is shorter than a previously set distance.

[2. Method for Controlling Travelling Vehicle System]

An operation of the travelling vehicle system will be described using FIGS. 4 to 6. It is to be noted that in the following, a case where a route (travelling route) selected by the travelling vehicle controller of the first travelling vehicle 10 is the same as a route selected by the second travelling vehicle 20 and a case where those routes are different will be separately described.

[2-1. Case where Travelling Routes for First Travelling Vehicle and Second Travelling Vehicle are the Same]

Figure 4:
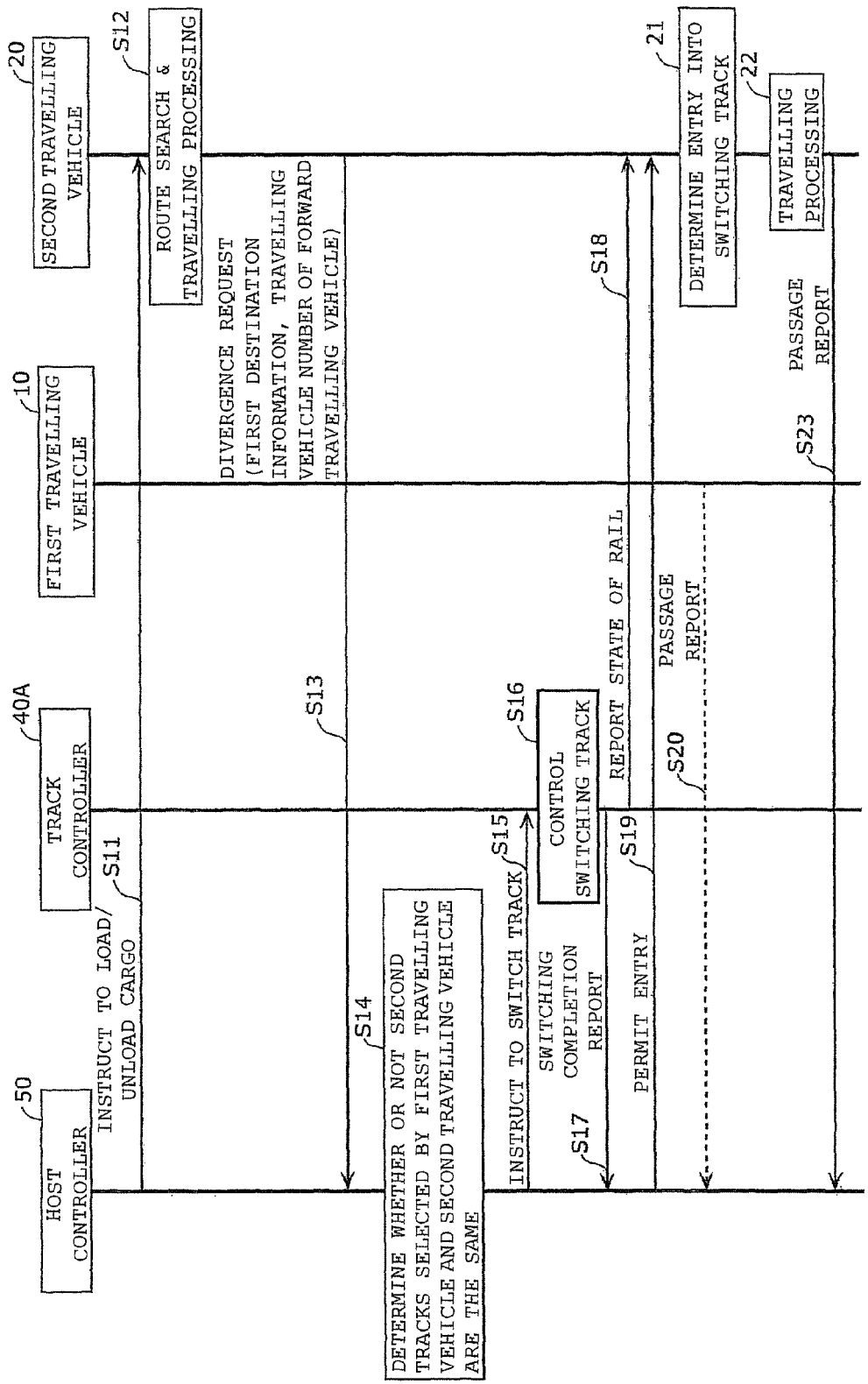
FIG. 4 is a sequence diagram illustrating operations of a host controller, a track controller, a first travelling vehicle and a second travelling vehicle.

FIG. 4 is a sequence diagram illustrating operations of the host controller 50, the track controller 40A, the first travelling vehicle 10 and the second travelling vehicle 20. FIG. 4 illustrates a case where a rail selected by the travelling vehicle controller of the first travelling vehicle 10 (corresponding to first travelling vehicle controller) is the same as a rail selected by the travelling vehicle controller 25 of the second travelling vehicle 20.

The host controller 50 transmits a cargo loading/unloading instruction to the first travelling vehicle 10 and the second travelling vehicle 20 (S11). The cargo loading/unloading instruction includes information of a cargo loading position and a cargo unloading position. Herein, a description will be given by taking as an example a case where an instruction about taking the rack 110A illustrated in FIG. 2 as a cargo loading position and taking the rack 110B as a cargo unloading position is given to both of the first travelling vehicle 10 and the second travelling vehicle 20. Further, in the present embodiment, a description will be given by taking as an example a case where the host controller 50 transmits the cargo loading/unloading instruction when the first travelling vehicle 10 and the second travelling vehicle 20 are located between the switching track 33B and the rack 110A.

As illustrated in FIG. 4, by the route search part 25a, the second travelling vehicle 20 searches a route on which it travels in accordance with the cargo loading/unloading instruction (S12). In FIG. 2, one route is selected out of two routes: a route taking the rail 31 and the rail 32A; and a route taking the rail 31 and the rail 32B. For example, in the case of storing a cargo in the receiving rack 110B when it is in the rack 110A, since there is no need to take the rail 32B, the route taking the rail 32A that has a shorter distance is selected. Similarly, as for the first travelling vehicle 10, the case of selecting the route taking the rail 32A will be described.

Herein, as described above, in the present embodiment, each of the first travelling vehicle 10 and the second travelling vehicle 20, when being located between the switching track 33B and the rack 110A, receives the cargo loading/unloading instruction from the host controller 50. In this case, each of the first travelling vehicle 10 and the second travelling vehicle 20 first travels on the rail 31, loads a cargo in the rack 110A and unloads the cargo in the rack 110B. Subsequently, each of the first travelling vehicle 10 and the second travelling vehicle 20 travels on the switching track 33A, travels on the rail 32A and travels on the switching track 33B, to return to the rail 31.

When the route search part 25a selects the route, it starts travelling processing for the second travelling vehicle 20. The travelling processing includes control of the inter-vehicle distance and control of the switching track.

The control of the inter-vehicle distance is constantly implemented during travelling. By the position detection part 23, each of the first travelling vehicle 10 and the second travelling vehicle 20 reads a barcode stuck to the rail 30 to detect the position while travelling. The timing for detecting the position is the timing at which each travelling vehicle passes through the barcode. By the third acquisition part 25d, the second travelling vehicle 20 receives position information from the travelling vehicle controller of the first travelling vehicle 10 via the second communication part 24. By the inter-vehicle distance calculation part 25e, the second travelling vehicle 20 obtains an inter-vehicle distance between the position shown by the position information received from the travelling vehicle controller of the first travelling vehicle 10 and the position of the second travelling vehicle 20 itself. For example when the inter-vehicle distance is a previously set first distance or longer, the inter-vehicle distance control part 25f allows the second travelling vehicle 20 to travel without changing travelling conditions. When the inter-vehicle distance is the first distance or shorter or is a previously set second distance or longer, the inter-vehicle distance control part 25f allows the second travelling vehicle 20 to travel at a decelerated speed. When the inter-vehicle distance is the second distance or shorter, the inter-vehicle distance control part 25f stops the second travelling vehicle 20. It is to be noted that the operation of the inter-vehicle distance control part 25f is not restricted to this.

The control of the switching track is performed when the switching track is approached. By the travelling vehicle controller 25, the second travelling vehicle 20 obtains, while traveling on the rail 31, a distance to the switching track 33A from a result of detecting the position by the position detection part 23. When approaching the switching track 33A within a certain range therefrom, the second travelling vehicle 20 transmits to the host controller 50 a divergence request for controlling the switching track 33A to connect the rail 31 to the selected rail (S13). The divergence request includes connection information showing a connection destination of the switching track 33A. Herein, the rail 32A has been set as the connection destination. Further, the divergence request includes a travelling vehicle number of the first travelling vehicle 10 travelling ahead.

The host controller 50 acquires the divergence request by the first acquisition part 51 and acquires from the divergence request the first destination information and the travelling vehicle number of the first travelling vehicle 10 travelling ahead. By the first determination part 52, the host controller 50 determines whether or not the rail selected by the travelling vehicle controller of the first travelling vehicle 10 is the same as the rail selected by the travelling vehicle controller 25 of the second travelling vehicle 20 (S14). Herein, as described above, the rail selected by the first travelling vehicle 10 is the rail 32A and the rail selected by the travelling vehicle controller 25 of the second travelling vehicle 20 is the rail 32A. Accordingly, the host controller 50 determines that the rail selected by the travelling vehicle controller of the first travelling vehicle 10 is the same as the rail selected by the travelling vehicle controller 25 of the second travelling vehicle 20.

When the host controller 50 determines by the first determination part 52 that the rail selected by the travelling vehicle controller of the first travelling vehicle 10 is the same as the rail selected by the travelling vehicle controller 25 of the second travelling vehicle 20, it generates a track switching instruction based on the first destination information. The host controller 50 then outputs the track switching instruction to the track controller 40A (S15). The track switching instruction includes the first destination information, for example. The first destination information here includes information showing the rail 32A.

The track controller 40A controls the switching track 33A in accordance with the track switching instruction (S16). Herein, in the case of FIG. 4, the rail shown by the first destination information included in the track switching instruction is the rail 32A while the currently connected rail is also the rail 32A, and both rails are thus the same. Since the rail shown by the first destination information is the same as the currently connected rail, the track controller 40A immediately outputs a switching completion report to the host controller 50 and the second travelling vehicle 20 (S17, S18).

Upon receipt of the switching completion report from the track controller 40A, the host controller 50 issues an entry permission into the switching track 33A to the second travelling vehicle 20 regardless of receipt or non-receipt of a report on passage through the switching track 33A from the travelling vehicle controller of the first travelling vehicle 10 (S19).

The host controller 50 receives the report on passage through the switching track 33A from the travelling vehicle controller of the first travelling vehicle 10 (S20). Although the timing at which the report on passage through the switching track 33A is received from the travelling vehicle controller of the first travelling vehicle 10 is taken as the timing after Step S19 in FIG. 4 for the sake of description, it is actually arbitrary timing. The passage report does not affect determination of entry permission into the switching track 33A to the second travelling vehicle 20. Further, although the host controller 50 issues the entry permission after the switching completion report from the track controller 40A here, since there is no need for switching the track, it may issue the entry permission without waiting for the switching completion report from the track controller 40A.

By the travelling vehicle controller 25, the second travelling vehicle 20 performs an entry determination into the switching track 33A (S21). More specifically, the travelling vehicle controller 25 checks the state of the switching track 33A and whether or not the entry permission has been issued from the host controller 50. The state of the switching track 33A is checked by use of the report signal A1 outputted from the sensor 61. The second travelling vehicle 20 receives the report signal A1 by the second acquisition part 25b via the second communication part 24, and acquires second destination information showing a rail connected to the rail 31 from the report signal A1. When the rail shown by the second destination information is the same as the selected rail and when the entry permission is issued from the host controller 50, the second travelling vehicle 20 determines by the second determination part 25c that the entry into the switching track 33A is possible. It is to be noted that the second travelling vehicle 20 maybe configured so as to further wait for the switching completion report of the switching track 33A, outputted from the track controller 40A in Step S18, and determine that the entry into the switching track 33A is possible.

The second travelling vehicle 20 travels on the switching track 33A after it has been determined by the second determination part 25c that the entry into the switching track 33A is possible (S22).

After passing through the switching track 33A, the second travelling vehicle 20 transmits the passage report to the host controller 50 by the travelling vehicle controller 25 (S23).

The second travelling vehicle 20 travels on the rail 32A after travelling on the switching track 33A. Before the second travelling vehicle 20 enters the switching track 33B, similarly to the case of the switching track 33A, the second travelling vehicle 20 performs the divergence request (corresponding to S13) and performs the entry determination into the switching track 33B (corresponding to S21) by the travelling vehicle controller 25. After it has been determined by the travelling vehicle controller 25 that the entry into the switching track 33B is possible, the second travelling vehicle 20 travels on the switching track 33B to return to the rail 31.

[2-2. Case where Travelling Routes for First Travelling Vehicle and Second Travelling Vehicle are Different]

Figure 5:
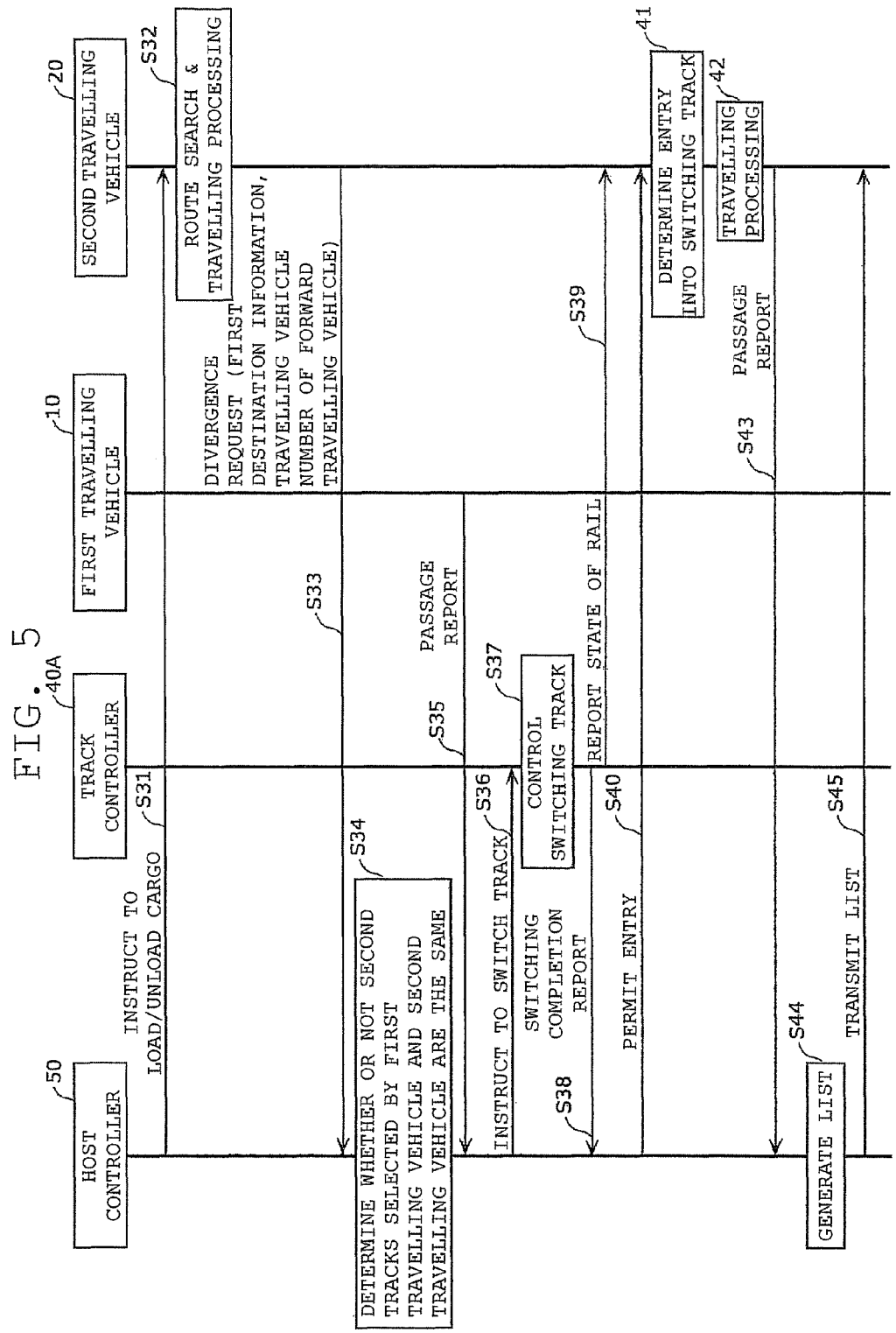
FIG. 5 is a sequence diagram illustrating operations of the host controller, the track controller, the first travelling vehicle and the second travelling vehicle.

FIG. 5 is a sequence diagram illustrating operations of the host controller 50, the track controller 40A, the first travelling vehicle 10 and the second travelling vehicle 20. FIG. 5 illustrates a case where the rail selected by the travelling vehicle controller of the first travelling vehicle 10 is different from the rail selected by the travelling vehicle controller 25 of the second travelling vehicle 20.

The host controller 50 transmits a cargo loading/unloading instruction to the first travelling vehicle 10 and the second travelling vehicle 20 (S31). The cargo loading/unloading instruction includes information of a cargo loading position and a cargo unloading position. Herein, an instruction about taking the rack 110A illustrated in FIG. 2 as the cargo loading position and taking the rack 110B as the cargo unloading position is given to the first travelling vehicle 10. A description will be given by taking as an example a case where an instruction about taking the rack 110A illustrated in FIG. 2 as the cargo loading position and taking the rack 110C as the cargo unloading position is given to the second travelling vehicle 20. Further, in the present embodiment, a description will be given by taking as an example a case where the host controller 50 transmits the cargo loading/unloading instruction when the first travelling vehicle 10 and the second travelling vehicle 20 are located between the switching track 33B and the rack 110A.

As illustrated in FIG. 5, by the route search part 25*a*, the second travelling vehicle 20 searches a route on which it travels in accordance with the cargo loading/unloading instruction (S32). In FIG. 2, one route is selected out of two routes: a route taking the rail 31 and the rail 32A; and a route taking the rail 31 and the rail 32B. For example, in the case of storing a cargo in the receiving rack 110C when it is in the rack 110A, the route taking the rail 32B is selected. As for the first travelling vehicle 10, similarly to the case of FIG. 4, the case of selecting the route taking the rail 32A will be described.

Herein, as described above, in the present embodiment, the second travelling vehicle 20, when being located between the switching track 33B and the rack 110A, receives the cargo loading/unloading instruction from the host controller 50. In this case, the second travelling vehicle 20 first travels on the rail 31, loads a cargo in the rack 110A, passes through the switching track 33A, and then unloads the cargo in the rack 110C arranged in the vicinity of the rail 32B. Subsequently, the second travelling vehicle 20 travels on the switching track 33B, to return to the rail 31. The same as in the case illustrated in FIG. 4 applies to the first travelling vehicle 10, and it travels on the rail 31, loads a cargo in the rack 110A, unloads the cargo in the rack 110B, travels on the switching track 33A, travels on the rail 32A, and travels on the switching track 33B, to return to the rail 31.

When the route search part 25*a* selects the route, it starts travelling processing for the second travelling vehicle 20. The travelling processing includes control of the inter-vehicle distance and control of the switching track. Control of the inter-vehicle distance is the same as in the case illustrated in FIG. 4.

Similarly to the case illustrated in FIG. 4, the control of the switching track is performed when the switching track is approached. By the travelling vehicle controller 25, the second travelling vehicle 20 obtains, while traveling on the rail 31, a distance to the switching track 33A from a result of detecting the position by the position detection part 23. When approaching the switching track 33A within a certain range therefrom, the second travelling vehicle 20 transmits to the host controller 50 a divergence request for controlling the switching track 33A to connect the rail 31 to the selected rail (S33). The divergence request includes connection information showing a connection destination of the switching track 33A. Herein, the rail 32B has been set as the connection destination. Further, the divergence request includes a travelling vehicle number of the first travelling vehicle 10 travelling ahead.

The host controller 50 acquires the divergence request by the first acquisition part 51 and acquires from the divergence request the first destination information and the travelling vehicle number of the first travelling vehicle 10 travelling ahead. By the first determination part 52, the host controller 50 determines whether or not the rail selected by the travelling vehicle controller of the first travelling vehicle 10 is the same as the rail selected by the travelling vehicle controller 25 of the second travelling vehicle 20 (S34). Herein, as described above, the rail selected by the travelling vehicle controller of the first travelling vehicle 10 is the rail 32A and the rail selected by the travelling vehicle controller 25 of the second travelling vehicle 20 is the rail 32B. Accordingly, the host controller 50 determines that the rail selected by the travelling vehicle controller of the first travelling vehicle 10 is different from the rail selected by the travelling vehicle controller 25 of the second travelling vehicle 20.

When it is determined by the first determination part 52 that the rail selected by the travelling vehicle controller of the first travelling vehicle 10 is different from the rail selected by the travelling vehicle controller 25 of the second travelling vehicle 20, the host controller 50 checks whether or not the first travelling vehicle 10 has passed through the switching track 33A (S35). Herein, when the report on passage through the switching track 33A has been transmitted from the travelling vehicle controller of the first travelling vehicle 10, the host controller 50 determines that the first travelling vehicle 10 has passed through the switching track 33A. It is to be noted that the method for determining whether or not the first travelling vehicle 10 has passed through the switching track 33A is not restricted to this. For example, a sensor for detecting whether or not a travelling vehicle has passed may be provided in the vicinity of the switching track 33A. In this case, when a signal showing passage of the travelling vehicle is received from the sensor, the host controller 50 determines that the first travelling vehicle 10 has passed through the switching track 33A.

Upon receipt of the passage report from the travelling vehicle controller of the first travelling vehicle 10, the host controller 50 generates a switching instruction based on the first destination information, and outputs the track switching instruction to the track controller 40A (S36). The track switching instruction includes the first destination information, for example. The first destination information here includes information showing the rail 32B.

The track controller 40A controls the switching track 33A in accordance with the track switching instruction (S37). Herein, in the case of FIG. 5, the rail shown by the first destination information included in the track switching instruction is the rail 32B while the currently connected rail is the rail 32A, and both rails are thus different. The track controller 40A slides the switching track 33A, to connect the rail 31 to the rail 32B.

Figure 6:
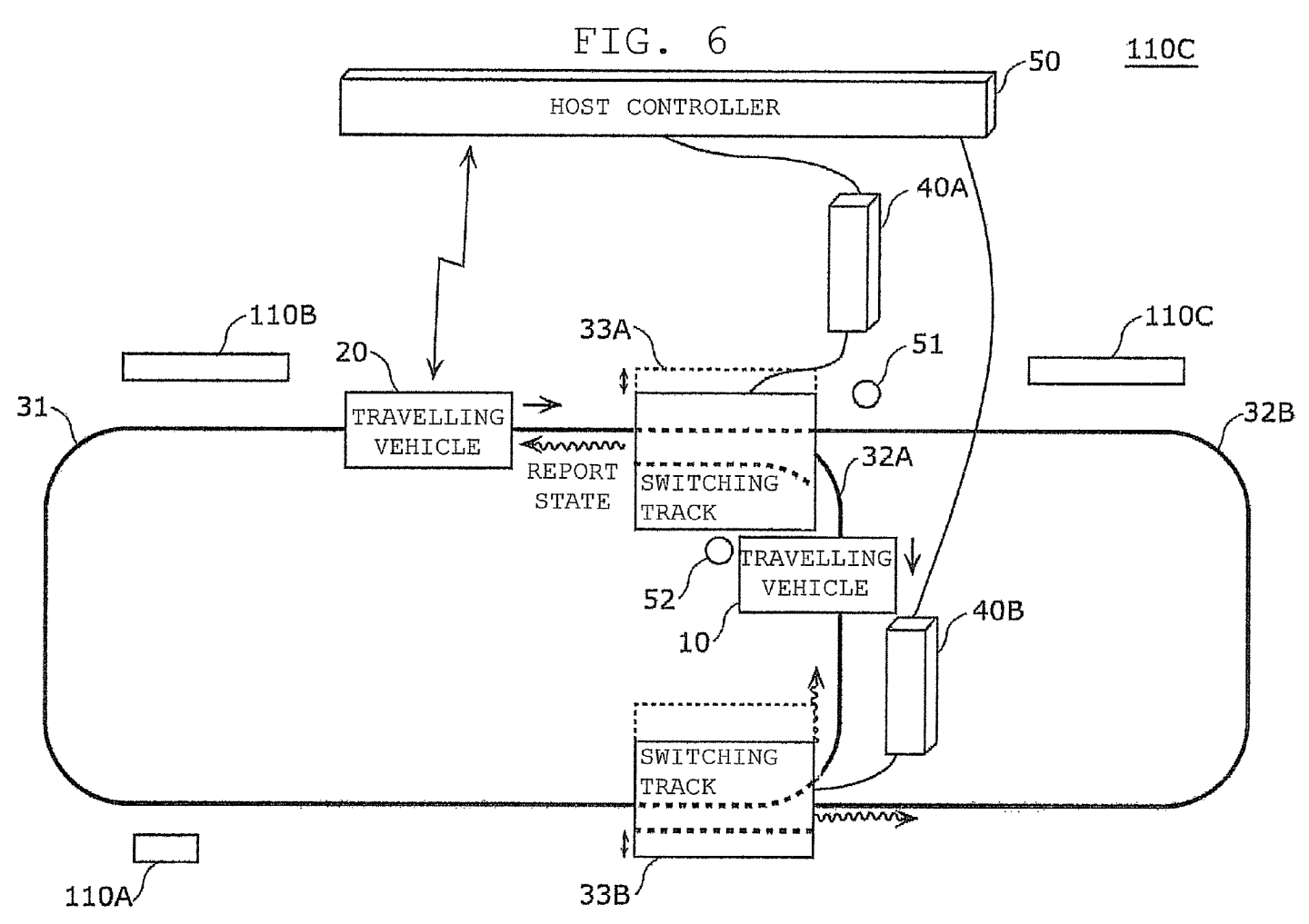

Herein, FIG. 6 illustrates the state of the travelling vehicle system 100 after switching of the switching track 33A.

After completion of the operation of the switching track 33A, the track controller 40A outputs the switching completion report to the host controller 50 and the second travelling vehicle 20 (S38, S39).

Upon receipt of the switching completion report from the track controller 40A, the host controller 50 issues an entry permission into the switching track 33A to the second travelling vehicle 20 after receipt of the report on passage through the switching track 33A from the travelling vehicle controller of the first travelling vehicle 10 (S40). Herein, since the passage report has already been received from the travelling vehicle controller of the first travelling vehicle 10 in Step S35, the host controller 50 issues the entry permission into the switching track 33A to the second travelling vehicle 20.

By the travelling vehicle controller 25, the second travelling vehicle 20 performs an entry determination into the switching track 33A (S41). More specifically, the travelling vehicle controller 25 checks the state of the switching track 33A and whether or not the entry permission has been issued from the host controller 50. The state of the switching track 33A is checked by use of the report signal A1 outputted from the sensor 61. The second travelling vehicle 20 receives the report signal A1 by the second acquisition part 25*b* via the second communication part 24, and acquires second destination information showing a rail connected to the rail 31 from the report signal A1. When the rail shown by the second destination information is the same as the selected rail and when the entry permission is issued from the host controller 50, the second travelling vehicle 20 determines by the second determination part 25*c* that the entry into the switching track 33A is possible.

The second travelling vehicle 20 travels on the switching track 33A after it has been determined by the second determination part 25*c* that the entry into the switching track 33A is possible (S42).

After passing through the switching track 33A, the second travelling vehicle 20 transmits the passage report to the host controller 50 by the travelling vehicle controller 25 (S43).

Upon receipt of the passage report from the travelling vehicle controller 25 of the second travelling vehicle 20, the host controller 50 generates by the list generation part 55 a list showing an alignment sequence of a plurality of travelling vehicles on the rail 32B where the second travelling vehicle 20 travels (S44). In the case of FIG. 5, with the first travelling vehicle 10 and the second travelling vehicle 20 travelling on the different routes, the forward travelling vehicle that travels ahead of the second travelling vehicle 20 is changed from the first travelling vehicle 10 to another travelling vehicle. For the control of the inter-vehicle distance and the like, the second travelling vehicle 20 needs to communicate with the new forward travelling vehicle. The list includes travelling vehicle numbers of the plurality of travelling vehicles. For example, the list may be made by arraying the travelling vehicle numbers of the plurality of travelling vehicles in the alignment sequence, or by storing the travelling vehicle numbers of the plurality of travelling vehicles in association with information showing the alignment sequence.

By the first communication part 56, the host controller 50 transmits the list to the second travelling vehicle 20 (S45). The travelling vehicle controller 25 of the second travelling vehicle 20 specifies the travelling vehicle travelling ahead from the list and communicates with the specified travelling vehicle. This enables inter-vehicle control, and the like.

After travelling on the switching track 33A, the second travelling vehicle 20 enters the rail 32B and unloads the cargo in the rack 110C. Further, before entry into the switching track 33B, similarly to the case of the switching track 33A, the travelling vehicle controller 25 of the second travelling vehicle 20 performs the divergence request (corresponding to S33) and performs the entry determination into the switching track 33B (corresponding to S41). After determining that the entry into the switching track 33B is possible, the travelling vehicle controller 25 of the second travelling vehicle 20 travels on the switching track 33B to return to the rail 31.

[3. Effects, Etc.]

In the above embodiment, when determining that the second track selected by the travelling vehicle controller of the first travelling vehicle 10 is the same as the second track selected by the travelling vehicle controller 25 of the second travelling vehicle 20, the host controller 50 issues the entry permission into the switching track 33A to the second travelling vehicle 20 regardless of receipt or non-receipt of the report on passage through the switching track 33A from the travelling vehicle controller of the first travelling vehicle 10.

Conventionally, even when the second track selected by the travelling vehicle controller of the first travelling vehicle 10 is the same as the second track selected by the travelling vehicle controller 25 of the second travelling vehicle 20, the host controller 50 waits for the passage report from the travelling vehicle controller of the first travelling vehicle 10 and issues the entry permission to the second travelling vehicle 20. There has thus occurred a case where, when the inter-vehicle distance is short or in some other case, the second travelling vehicle 20 waits before the switching track 33A. However, when the second track selected by the travelling vehicle controller of the first travelling vehicle 10 is the same as the second track selected by the travelling vehicle controller 25 of the second travelling vehicle 20, it is not necessary to switch the switching track 33A. Hence even when receiving no passage report from the travelling vehicle controller of the first travelling vehicle 10, the second travelling vehicle 20 can safely travel on the switching track 33A.

In the above embodiment, when the second track selected by the travelling vehicle controller of the first travelling vehicle 10 is the same as the second track selected by the travelling vehicle controller 25 of the second travelling vehicle 20, the host controller 50 issues the entry permission to the second travelling vehicle 20 without waiting for the passage report from the travelling vehicle controller of the first travelling vehicle 10. This enables smooth travelling of the second travelling vehicle 20.

Further, when determining that the second track selected by the travelling vehicle controller of the first travelling vehicle 10 is the same as the second track selected by the travelling vehicle controller 25 of the second travelling vehicle 20, the host controller 50 transmits the switching instruction to the track controller 40A regardless of receipt or non-receipt of the report on passage through the switching track 33A from the travelling vehicle controller of the first travelling vehicle 10.

When the second track selected by the travelling vehicle controller of the first travelling vehicle 10 is the same as the second track selected by the travelling vehicle controller 25 of the second travelling vehicle 20, it is not necessary to switch the switching track 33A. Hence even when the switching instruction is transmitted, no driving is substantially performed in the track controller 40A.

Hence even when receiving no passage report from the travelling vehicle controller of the first travelling vehicle 10, the second travelling vehicle 20 can safely travel on the switching track 33A.

In the above embodiment, when the second track selected by travelling vehicle controller of the first travelling vehicle 10 is the same as the second track selected by the travelling vehicle controller 25 of the second travelling vehicle 20, the host controller 50 transmits the switching instruction to the track controller 40A without waiting for the passage report from the travelling vehicle controller of the first travelling vehicle 10. It is thereby possible to reduce the time until reception of the switching completion report. This enables smoother travelling of the second travelling vehicle 20.

(Other Embodiments)

It is to be noted that the present invention is not restricted to the above embodiment. For example, another embodiment realized by arbitrarily combining the constituents described in the present specification or excluding some of the constituents may be taken as an embodiment of the present invention. Further, the present invention includes an alternative embodiment obtained by applying a variety of alternatives conceivable by a person skilled in the art to the above embodiment in a range not deviating from the gist of the present invention, namely the meaning shown by wording recited in the claims.

For example, although the case where the report signal A1 is outputted from the sensor 61 and the sensor 62 has been described in the above embodiment, there may be formed a configuration where the report signal A1 is outputted from another device such as the switching track 33A.

The present invention is available for an automatic warehouse, a factory and the like in which a cargo is carried in the vicinity of a ceiling and stored in a rack.

What is claimed is:

1. A travelling vehicle system comprising:
   a track including a first track and a plurality of second tracks;
   a plurality of travelling vehicles including a first travelling vehicle travelling along the track and a second travelling vehicle travelling behind the first travelling vehicle along the track;
   a first travelling vehicle controller provided in the first travelling vehicle;
   a second travelling vehicle controller provided in the second travelling vehicle;
   a switching track which is provided between the first track and the plurality of second tracks and connects the first track to one of the plurality of second tracks;
   a track controller which controls the switching track; and
   a host controller which issues an entry permission into the switching track to the plurality of travelling vehicles, wherein
   the host controller
   acquires, from the second travelling vehicle controller, first destination information showing one second track selected by the second travelling vehicle controller out of the plurality of second tracks,
   determines whether or not a second track selected by the first travelling vehicle controller is the same as the second track selected by the second travelling vehicle controller, by use of the first destination information, and
   issues the entry permission,
   wherein the host controller issues the entry permission into the switching track to the second travelling vehicle controller after checking passage of the first travelling vehicle through the switching track when the host controller determines that the second track selected by the first travelling vehicle controller is different from the second track selected by the second travelling vehicle controller, and
   issues the entry permission into the switching track to the second travelling vehicle controller regardless of receipt or non-receipt of the passage report from the first travelling vehicle controller when the host controller determines that the second track selected by the first travelling vehicle controller is the same as the second track selected by the second travelling vehicle controller.

2. The travelling vehicle system according to claim 1, wherein
   the second travelling vehicle controller
   acquires second destination information showing the second track on a side connected to the first track via the switching track, and
   allows the travelling vehicle to enter the switching track when the second track shown by the second destination information is the same as the second track selected by the second travelling vehicle controller and when the entry permission is issued from the host controller.

3. The travelling vehicle system according to claim 1, wherein the host controller
   upon receipt of a passage report showing passage through the switching track from the second travelling vehicle controller, generates a list showing an alignment sequence of a plurality of travelling vehicles on the second track selected by the second travelling vehicle controller, and
   transmits the list to the second travelling vehicle controller.

4. The travelling vehicle system according to claim 1, wherein
   the second travelling vehicle detects a position on the track, and communicates with the first travelling vehicle, and
   the second travelling vehicle controller
   acquires position information of the first travelling vehicle from the first travelling vehicle controller,
   calculates an inter-vehicle distance between the first travelling vehicle and the second travelling vehicle by use of the position information, and
   stops or decelerates the second travelling vehicle when the inter-vehicle distance is shorter than a previously set distance.

5. The travelling vehicle system according to claim 4, wherein the second travelling vehicle is configured to be wirelessly communicable with the host controller during travelling.

6. The travelling vehicle system according to claim 1, wherein
   the host controller
   transmits, to the track controller, connection information showing the second track to be connected to the first track after receipt of the passage report from the first travelling vehicle controller when the host controller determines that the second track selected by the first travelling vehicle controller is different from the second track selected by the second travelling vehicle controller, and
   which transmits, to the track controller, the connection information regardless of receipt or non-receipt of the passage report from the first travelling vehicle controller when the host controller determines that the second track selected by the first travelling vehicle controller is the same as the second track selected by the second travelling vehicle controller.

* * * * *